US012117319B2

(12) United States Patent
Boehm et al.

(10) Patent No.: US 12,117,319 B2
(45) Date of Patent: Oct. 15, 2024

(54) DISPLAY METHODS, TECHNIQUES, AND APPARATUS FOR OBSCURED FEATURE DETECTORS

(71) Applicant: Franklin Sensors Inc., Meridian, ID (US)

(72) Inventors: Natalie A. Boehm, Meridian, ID (US); David M. Dorrough, Eagle, ID (US); Jay R. Paxman, Meridian, ID (US); Daniel S. Toborg, Meridian, ID (US)

(73) Assignee: Franklin Sensors Inc., Meridian, ID (US)

( * ) Notice: Subject to any disclaimer, the term of this patent is extended or adjusted under 35 U.S.C. 154(b) by 216 days.

(21) Appl. No.: 17/654,377

(22) Filed: Mar. 10, 2022

(65) Prior Publication Data

US 2023/0288233 A1 Sep. 14, 2023

(51) Int. Cl.

| | |
|---|---|
| ***G01D 7/00*** | (2006.01) |
| ***G01D 5/24*** | (2006.01) |
| ***G01D 7/02*** | (2006.01) |
| ***G01D 18/00*** | (2006.01) |
| ***G01V 3/08*** | (2006.01) |

(52) U.S. Cl.

CPC ............... *G01D 7/005* (2013.01); *G01D 5/24* (2013.01); *G01D 7/02* (2013.01); *G01D 18/00* (2013.01); *G01V 3/08* (2013.01)

(58) Field of Classification Search

CPC ........ G01R 27/00; G01R 27/02; G01R 27/26; G01R 27/2605; G01D 5/00; G01D 5/12; G01D 5/14; G01D 5/24; G01D 7/00; G01D 7/005; G01D 7/02; G01D 18/00; G01V 3/00; G01V 3/08; G01V 3/088; G01V 3/15

USPC ........................................................ 324/323

See application file for complete search history.

(56) References Cited

U.S. PATENT DOCUMENTS

| | | | | |
|---|---|---|---|---|
| 4,992,741 | A | 2/1991 | Douglas et al. | |
| 7,116,091 | B2 | 10/2006 | Miller | |
| 8,476,912 | B2 * | 7/2013 | Dorrough | G01V 3/165 324/687 |
| 8,593,163 | B2 * | 11/2013 | Dorrough | G01V 3/088 324/67 |
| 8,669,772 | B2 * | 3/2014 | Dorrough | G01R 27/26 324/67 |
| 9,903,975 | B1 * | 2/2018 | Smoot | G01R 27/2605 |
| 10,347,443 | B1 * | 7/2019 | Wu | G02B 6/005 |
| 2018/0018026 | A1 * | 1/2018 | Bushnell | G06F 3/0362 |
| 2018/0069550 | A1 * | 3/2018 | Lehmann | H03K 17/975 |

FOREIGN PATENT DOCUMENTS

| | | | | |
|---|---|---|---|---|
| JP | 2023007935 A * | 1/2023 | | G01V 3/08 |
| WO | WO-2018133152 A1 * | 7/2018 | | G01V 11/00 |

OTHER PUBLICATIONS

"FLIR One Pro LT", Pro-Grade Thermal Camera for Smartphone (2022).

"Zircon MultiScanner i520 OneStep", Item # T9FB2277468 (2022).

* cited by examiner

*Primary Examiner* — Hoai-An D. Nguyen

(74) *Attorney, Agent, or Firm* — Foley & Lardner LLP

(57) ABSTRACT

Systems are described for variably displaying at a display of an obscured feature detector a variable output responsive to signal strength at one or more sensor elements of the obscured feature detector. The variable output may vary by one or more of luminance, color, size, shape, etc.

28 Claims, 10 Drawing Sheets

DISPLAY METHODS, TECHNIQUES, AND APPARATUS FOR OBSCURED FEATURE DETECTORS

TECHNICAL FIELD

The present disclosure is generally directed to devices to detect a presence of an obscured feature behind an obscuring material or surface, and more directly to displays for devices to locate beams or studs behind or within walls, ceilings, etc., and joists beneath/within floors.

BACKGROUND

Presently, locating obscured features, e.g., beams, studs, joists, architectural features, etc., behind or within walls, ceilings, or floors is a common problem encountered during construction, repair, renovation, and similar activities. For example, a desire often arises to cut or drill into a wall, floor, or other supported surface (hereafter, and without limiting the present disclosure, referred to as wallboard) with the aim of creating an opening in the wallboard while avoiding the underlying support features. Knowing where the support features are positioned before beginning can be desirable to avoid cutting or drilling into, or otherwise affecting such support features. On other occasions, one may desire to anchor an object, such as, e.g., a picture or shelf, to a support feature obscured by a wallboard. It is often desirable to install a fastener through the wallboard in alignment with, affixing to, or engaging the underlying support feature that is visually obscured by the wallboard.

A variety of techniques have been employed with limited success to address the problem of locating features obscured by a wallboard. One such technique involves driving small pilot nails through the wallboard at various locations until an underlying obscured support feature is encountered, then covering over the holes in the wallboard which do not reveal the location of the support feature. A less destructive technique comprises tapping on the wallboard while listening to the resulting sound in an effort to detect audible variations in the sound suggesting the presence of an underlying obscured support feature. This technique often proves ineffective because it relies on the subjective judgement of the person tapping the wallboard, and because variations in material composing the wallboard and any covering material (wall covering), thickness of the wallboard (and variations in material and thickness therein) and wall covering, etc., make the technique unreliable.

Magnetic detectors may be used to find obscured support features wherein the detector relies on the presence of metallic fasteners, such as screws or nails, in the support features to trigger a response in the detector. Because metallic fasteners may be disparately located, a magnetic detector may fail to detect the presence of an obscured support feature. Another method involves the use of electronic detectors which sense changes in the capacitance of the wallboard (and any wall covering, etc.), presuming such capacitance change results from the presence of an obscured support feature. These electronic detectors lack ability to compensate for changes in capacitance resulting from variations in the material and/or thickness of the wallboard (and wall covering), the presence of non-support features behind the obscuring material, etc. Other systems may involve the use of radar, which is also susceptible to inaccuracies due to thickness and material of the wallboard and/or wall covering. Compounding the foregoing issues, obscured feature detectors have been limited by their ability to provide a detailed indication of the presence of an obscured support feature.

SUMMARY

The present disclosure provides systems and methods for more accurately displaying detection of an obscured feature located behind/beneath an obscuring surface.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not be considered limiting of the scope of the disclosure, the embodiments will be described and explained with specificity and detail in reference to the following accompanying drawings.

DETAILED DESCRIPTION OF PREFERRED EMBODIMENTS

Figure 1A:
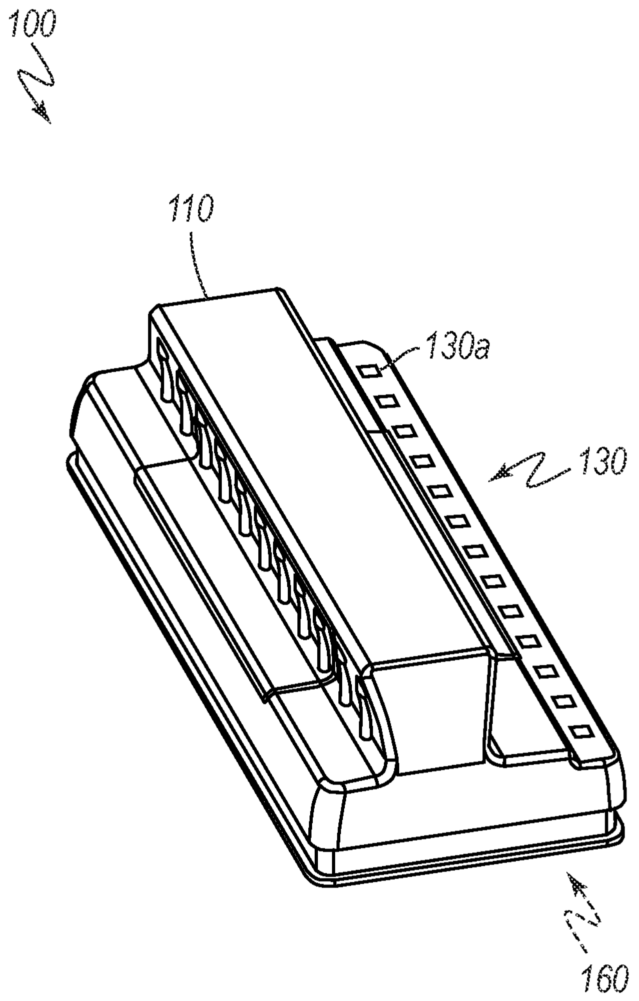
FIG. 1A is a perspective view of an obscured feature detector (OFD), according to an embodiment of the present disclosure.

As is well-known, currently available obscured feature detectors generally employ a visual signal, such as, e.g., one or more light-emitting diodes (LEDs), a liquid-crystal display (LCD) module, etc. These obscured feature detectors employ such LEDs or LCDs in a binary mode; meaning, the display element (whether LED or LCD) is either on or off, suggesting, respectively, the presence or absence of an obscured feature. Furthermore, manufacturers calibrate obscured feature detectors to a single threshold relative to a signal strength from a sensor (or sensor array). That is to say, the obscured feature detector may be calibrated to a particular sensitivity selected by the manufacturer, and the sensitivity selection may range from high to low. A high sensitivity selection is susceptible to producing false positives (signaling the presence of a support feature where no support feature exists). A low sensitivity selection is susceptible to producing false negatives (failing to indicate the presence of a support feature). A sensitivity selection between high and low is susceptible to producing various degrees of false positives and false negative. Some currently marketed obscured feature detectors employ an audible signal to indicate detection; however, the same issues (binary nature, false positive/negative indication) persist. Some obscured feature detectors electrically or electronically couple to mobile device, such as, e.g., a "smartphone" or a tablet computer to serve as a display. While a smartphone or a tablet computer may have a highly variable display, the same issues may persist if the display is, essentially, driven by an obscured feature detector, which is not capable of producing a non-binary variable output and is the source of false positives/negatives.

The present disclosure provides systems for non-binary indication of obscured features and avoids the false positive/negative indication ramifications of existing obscured feature detectors. In some applications, an embodiment of the present disclosure may enable identification of the type of obscured feature, such as, e.g., a plumbing element, a duct, a wiring element, a support member, etc.

As used herein, the term "wallboard" refers to an architectural element of a wall, a floor, a ceiling, a half-wall, a partition, etc., which is affixed to a support feature, and includes any wall covering (e.g., wallpaper, veneer, paint, tile, etc.). A wallboard may comprise wood, a manufactured wood product (e.g., particle board, chip board, plywood, fiberboard, etc.), gypsum, SHEETROCK®, lath-and-plaster, cement board, plastic, etc.

As used herein, the phrase "support feature" refers to an architectural element that supports, or is a comprising member of a wall, a half-wall, a partition, a floor, a ceiling, etc. Examples of a support feature are, without limitation, a stud, a king stud, a jack (or trimmer) stud, a cripple stud, a header, a stringer, a beam, a joist, a rafter, a collar tie, blocking, nogging, etc.

As used herein, the phrase "obscured feature" refers to an element, such as, e.g., a support feature, an electrical box, electrical wiring, a duct, a plumbing component, etc., that is behind or within, or partially behind and partially within an architectural feature comprising a wallboard such that the obscured feature is not readily visible from the working side of the wallboard without deconstruction or partial deconstruction of the architectural feature.

As used herein, the phrase "working side" refers to an exposed face of a wallboard (or a covering of an architectural feature) which can be accessed with a tool or a hand without first deconstructing or partially deconstructing the wallboard, and from which it is desired to perform some work that engages the wallboard, a support feature, or an obscured feature within/behind the wallboard. By way of non-limiting example, the working side may be an exposed portion of an interior wall whereupon one wishes to hang a picture, and the interior wall is disposed between two interior rooms such that the working side is (a) not within the wall and (b) is on the face of the wall where the picture is to be hung (i.e., not on a face of the wall in the "other" room).

FIG. 1A is a perspective view of an obscured feature detector (OFD) 100, according to an embodiment of the present disclosure. The OFD 100 comprises a housing 110, a variable output display 130 and a sensor array 160 of one or more sensing elements configured to produce a signal based on detection of capacitance. The variable output display 130, in the present embodiment, comprises a plurality of light-emitting diodes ("LED," pl. "LEDs"), of which a first LED 130*a* is identified. The variable display output 130 is configured to render a variable output based on input (capacitance signal strength) from one or more of the sensor elements of the sensor array 160.

Figure 1B:
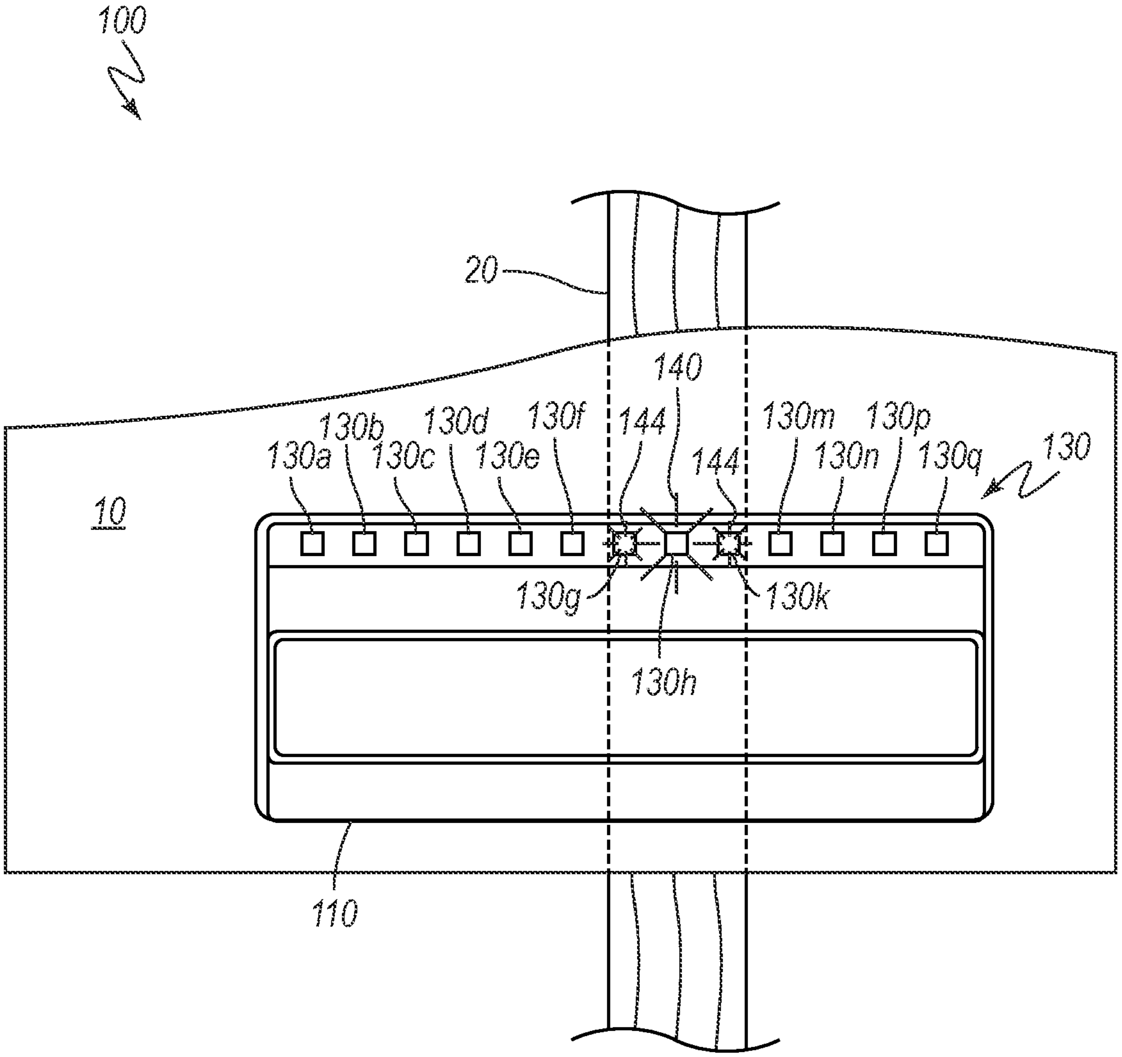
FIG. 1B is a plan view of the OFD of FIG. 1A disposed at a supported surface 10.

FIG. 1B is a plan view of the OFD 100 of FIG. 1A disposed at a supported surface 10. Hereafter, for convenience of the disclosure and without limitation, the supported surface 10 is referred to as a "wallboard" though the support surface 10 may be any suitable surface or material behind which features may be obscured and thereby amenable to detection. The wallboard 10 is depicted cut away to partially expose a support feature 20. The OFD 100 comprises the housing 110 to house the variable output display 130. The variable output display 130, in the present embodiment, comprises a plurality of LEDs 130*a*-130*q* (to avoid confusion, for each label series ending in a letter, instances of i, j, l, and o are omitted).

The OFD 100 is positioned at the wallboard 10 such that the LED 130*h* is centered, or nearly centered, over the support feature 20. Immediately adjacent and disposed to either side are the LEDs 130*g* and 130*k*. The LEDs 130*g*, 130*k* are shown disposed over the support feature 20 and near opposite sides of the support feature 20. The LED 130*h*, disposed most centrally over the support feature 20, has a luminance 140. The LEDs 130*g*, 130*k*, disposed less centrally over the support feature 20, each has a luminance 144, the luminance 144 being perceptibly less than the luminance 140 of the LED 130*h*. The remaining LEDs 130*a*-130*e*, 130*m*-130*q* are shown with no luminance. The lack of luminance from the LEDs 130*a*-130*e*, 130*m*-130*q* indicates no obscured feature is detected at these locations. The luminance of the LEDs 130*g*-130*k* indicates the presence of a detected obscured feature 20 in the location spanned by these LEDs 130*g*-130*k*. More particularly, the luminance 140 of the LED 130*h* indicates the LED 130*h* is disposed over or nearly over a center of the obscured feature 20, and the luminance 144 of the LEDs 130*g*, 130*k* indicates the LEDs 130*g*, 130*k* are disposed over or near an edge of the obscured feature 20. In this manner of varying levels of luminance, the LEDs 130*a*-130*q* are each an example of a variable output display element, according to one embodiment of the present disclosure, which individually and collectively provide variability to the variable output display 130 to display for a user greater information about what the array of sensing elements 160 is detecting.

In one embodiment, any of the LEDs 130*a*-130*q* may emit no luminance when not disposed over or near the obscured feature 20. In one embodiment, the LEDs 130*a*-130*q* may have a particular low (or baseline) luminance when not disposed over or near the obscured feature 20 to signal that the OFD 110 is energized, and a luminance of any of the LEDs 130*a*-130*q* to indicate detection of the obscured feature 20 to any degree is perceptibly greater than the baseline luminance. While the OFD 100 is shown with 13 LEDs 130*a*-130*q*, this is for convenience of the present disclosure and not by way of limitation. The present disclosure includes a display 130 of the OFD 110 having fewer or more LEDs 130*a*-130*q*. Furthermore, while reference in the present embodiment is to a display 130 comprising LEDs 130*a*-130*q*, this is not intended to limit the disclosure. The present disclosure anticipates display elements other than LEDs, such as, e.g., a liquid crystal display (LCD) module, etc. The present disclosure anticipates that the variable output display 130 may be arranged in a different manner than that shown in FIGS. 1A and 1B, such as, e.g., where each LED 130*a*-130*q* is illustrated, a column of two or more LEDs may be disposed, and the number of LEDs energized (and, in an embodiment, the luminance 140, 144 of the LEDs) in a given column corresponds to a detection of an obscured feature.

Figure 2A:
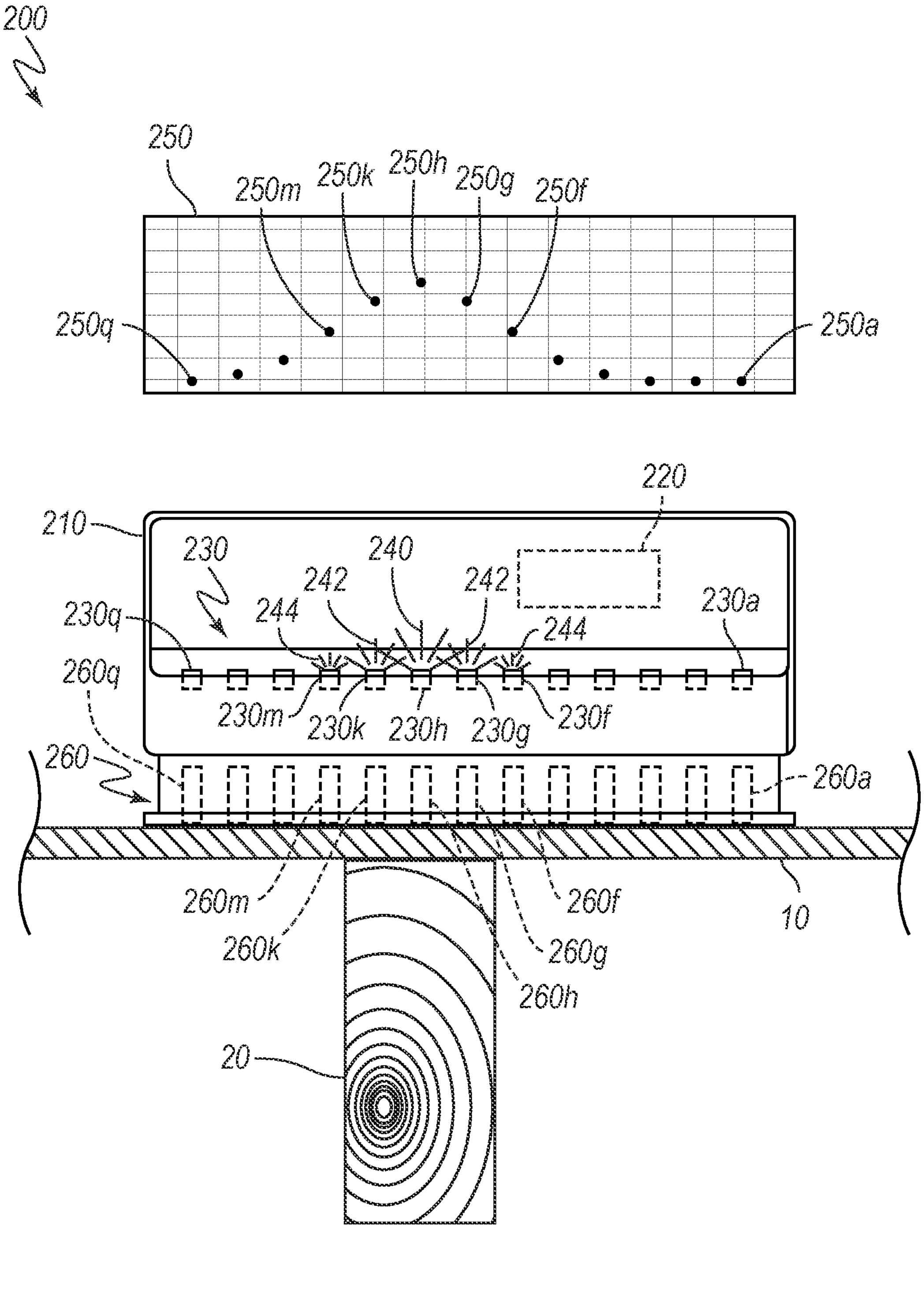
FIG. 2A is a top view of an obscured feature detection system (OFDS), similar in at least some aspects to the OFDS 100 of FIGS. 1A and 1B, along with a power table.

FIG. 2A is a top view of an obscured feature detection system (OFDS) 200, according to an embodiment of the present disclosure, along with a power table 250. The OFDS 200 may be similar in at least some aspects to the OFDS 100 of FIGS. 1A and 1B. The OFDS 200 comprises an obscured feature detector (OFD) 210, which may be similar in some respects to the OFD 100 of FIGS. 1A and 1B. The OFD 210 is shown, diagrammatically, as if disposed against a wallboard 10 and over an obscured feature 20. The OFD 200 comprises a controller 220, a display 230, and a sensor array 260. The variable output display 230 comprises a plurality of LEDs 230*a*-230*q*, which may be analogous or otherwise similar to the LEDs 130*a*-130*q* of FIGS. 1A and 1B. The sensor array 260 comprises a plurality of discrete sensor elements 260*a*-260*q*. Each LED 230*a*-230*q* corresponds to a respective sensor element 260*a*-260*q*. Each corresponding sensor element 260*a*-260*q* may couple to its respective LED 230*a*-230*q* at or through the controller 220. The controller 220 may activate (and may modulate or otherwise vary) the variable output display elements (the LEDs 230*a*-230*q*) to drive display of an indication of the strength of a capacitance sensor reading from one or more of the sensor elements 260*a*-260*q*. The controller 220 is electrically coupled to each of the sensor elements 260*a*-260*q* and to each of the LEDs 230*a*-230*q*. The controller 220 may receive in real time from each sensor element 230*a*-230*q* a signal having a signal strength or magnitude based on a proximity to the obscured feature 20, as well as the composition, density, etc., of the obscured feature and the overlying wallboard 10. The controller 220 may, based on the signal strength from each sensor element 260*a*-260*q*, cause a corresponding signal to be sent to each respective LED 230*a*-230*q*, thereby causing each LED 230*a*-230*q* to become energized at a particular state to generate a corresponding luminance 240-244. In other words, each of the LEDs 230*a*-230*q* of the variable output display 230 may vary by changing in brightness.

By way of non-limiting example, in FIG. 2A, the sensor elements 260*f*-260*m* are shown near the obscured feature 20. The sensor element 260*h* is disposed over or nearly over the center of the obscured feature 20 and is sending a signal of a first signal strength to the controller 220. The sensor elements 230*g*, 230*k* are located between a center and an edge of the obscured feature 20 and each is sending to the controller 220 a signal of a second signal strength less than the first strength. The sensor elements 260*f*, 260*m* are located near, but not over the obscured feature 20, and are each sending to the controller 220 a signal of a third signal strength less than the second signal strength. The controller 220 controls each respective LED 230*f*-230*m* to become energized corresponding to the signal strength received from the relevant sensor elements 260*f*-260*m*. The LED 230*h*, corresponding to the sensor element 260*h* is energized to a first luminance 240; the LEDs 230*g* and 230*k*, corresponding respectively to the sensor elements 260*g*, 260*k*, are energized to a second luminance 242 less than the first luminance 240. The LEDs 230*f* and 230*m*, corresponding respectively to the sensor elements 260*f*, 260*m*, are energized to a third luminance 244 less than the second luminance 242.

The power table 250 reflects relative energization level (hereafter, "power state" 250*a*-250*q* for each of the LEDs 230*a*-230*q* for the OFD 210 as shown in FIG. 2A. In one embodiment, a power state 250*a*-250*q* may reflect an amount of electrical energy being delivered. In one embodiment, a power state 250*a*-250*q* may reflect a control signal being delivered. In one embodiment, a power state 250*a*-250*q* may reflect a combination of electrical power and a control signal. A baseline power state 250*a* corresponds to first LED 230*a* and may reflect either a low or no power state. A first power state 250*h* corresponds to the luminance 240 of the LED 230*h* in response to the signal strength of the sensor element 260*h* that is located over or near the center of the obscured structure 20. Similarly, a second power state 250*g*, 250*k* corresponds to the second luminance 242 for the LEDs 230*g*, 230*k* in response to the signal strength of the sensor elements 260*g*, 260*k* located between the center and an edge of the obscured feature 20. A third power state 250*f*, 250*m* corresponds to the third luminance 244 of the LEDs 230*f*, 230*m* in response to the signal strength of the sensor elements 260*f*, 260*m* that are located near but not over the obscured feature 20. The LEDs 230*a*-230*q*, with the first luminance 240, second luminance 242, and third luminance 244, are each an example of a variable output display element, according to one embodiment of the present disclosure. Stated otherwise, in one embodiment, the display elements 230*a*-230*q* of the variable output display 230 may vary in direct proportion to a strength of a sensor reading. Additionally, controller 220 may be configured to activate the variable output display 230, or distinct LEDs 230*a*-230*q* or the variable output display 230 with more than one level of sensitivity (or in response to more than one level of signal strength from one or more of the sensor elements 260*a*-260*q*). In one embodiment, the sensitivity may manually selectable or adjustable by a user of the OFDS 200.

Figure 2B:
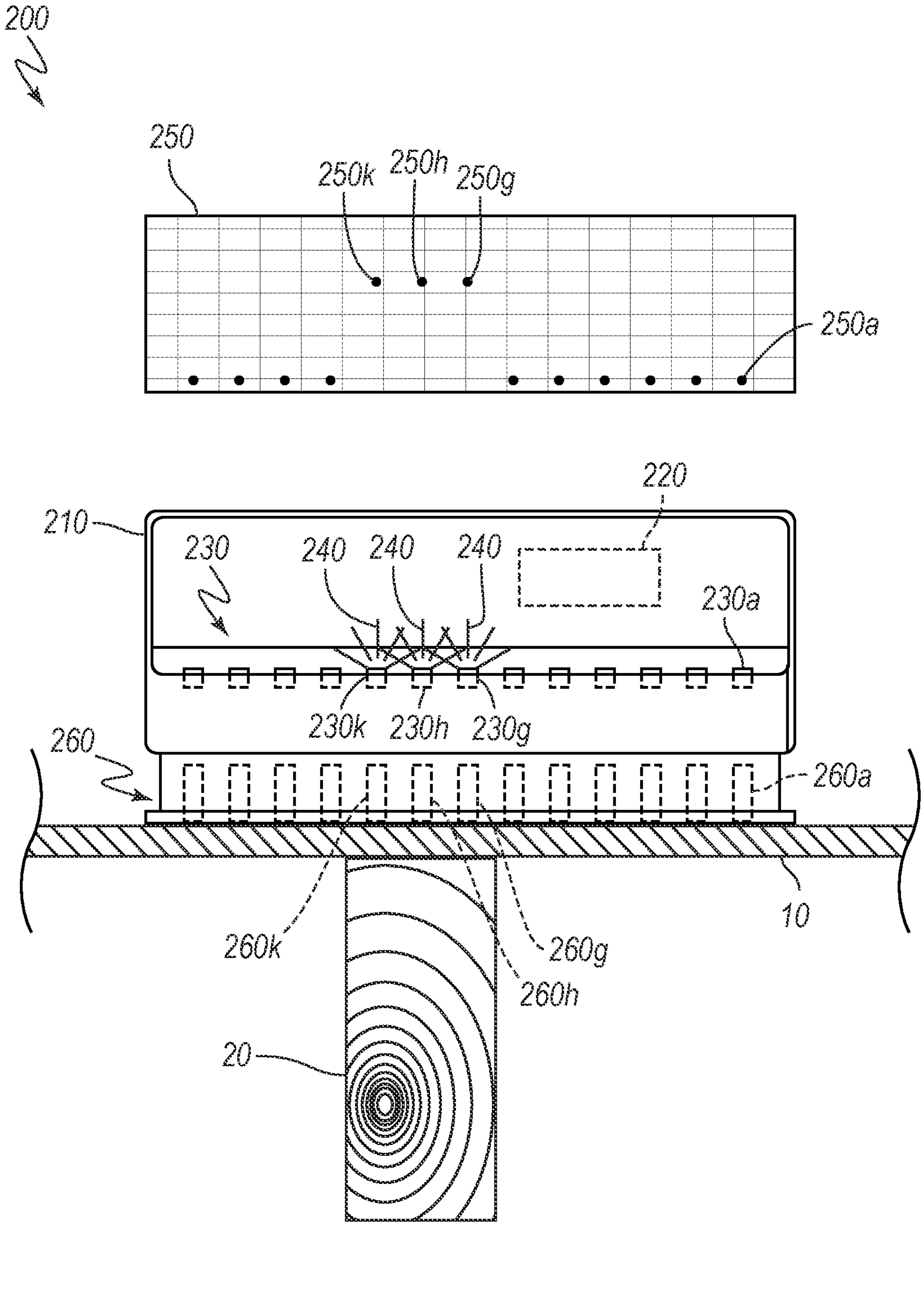
FIG. 2B is a top view of the OFDS of FIG. 2A with the power table reflecting the OFD operating in a binary output mode.

FIG. 2B is a top view of the OFDS 200 of FIG. 2A, according to an embodiment of the present disclosure, with the power table 250 reflecting the OFD 210 operating in a binary output mode. The controller 220 is shown for reference. The first sensor element 260*a* of the sensor array 260, and the first LED 230*a* of the variable output display 230 are shown and indicated for reference. The OFD 210 is shown, diagrammatically, as if disposed at the wallboard 10 and at least partially over the obscured feature 20. The sensor elements 260*g*, 260*h*, 260*k* are located over the obscured feature 20. In the illustration of FIG. 2B, the OFD 210 has been placed in a binary output mode. In the binary output mode, the sensor elements 260*a*-260*q* continue to each deliver to the controller 220 a signal having a signal strength corresponding to the particular sensor element 260*a*-260*q* location relative to the obscured feature 20. In other words, each sensor element 260*a*-260*q* continues to send to signal to the controller based on the degree of detection of the obscured feature 20 at the particular sensor element 260*a*-260*q*. The controller 220 interprets the relative signal strengths from the sensor elements 260*a*-260*q* and sends a power state 250*a*-250*q* to each LED 230*a*-230*q* whereby each LED 230*a*-230*q* is either energized or not energized, or energized either to a first and equal energy state or to a second and equal energy state less than the first equal energy state. The controller 220 may be configured with a binary threshold, above which a signal strength from any sensor element 260*a*-260*q* indicates the presence of the obscured feature 20, and below which indicates the absence of an obscured feature 20.

By way of non-limiting example, in the illustration of FIG. 2B, the sensor elements 260*g* and 260*k* are located over the obscured feature 20, with each between the center and a side of the obscured feature 20. The sensor element 260*h* is located over or nearly over the center of the obscured feature 20. The sensor element 260*h* is sending a signal of a first signal strength to the controller 220, while the sensor elements 260*g*, 260*k* are each sending to the controller 220 a signal of a second signal strength less than the first signal strength. The other sensor elements 260*a*-260*q* (less 260*g*-260*k*) may be sending signal of a significantly lower signal strength to the controller 220. The signal strength of the signals from the sensor elements 260*g*-260*k* is above the binary threshold of the controller 220 in the binary output mode, and the controller 220 sends a power state 250*g*, 250*h*, 250*k* causing the LEDs 230*g*, 230*h*, 230*k* to be energized at the same first luminance 240, while all other LEDs are not energized (or are equally energized at a luminance significantly less than the first luminance 240). In this manner of varying levels of luminance, the LEDs 230*a*-230*q* are each an example of a variable output display element, according to one embodiment of the present disclosure.

Figure 3:
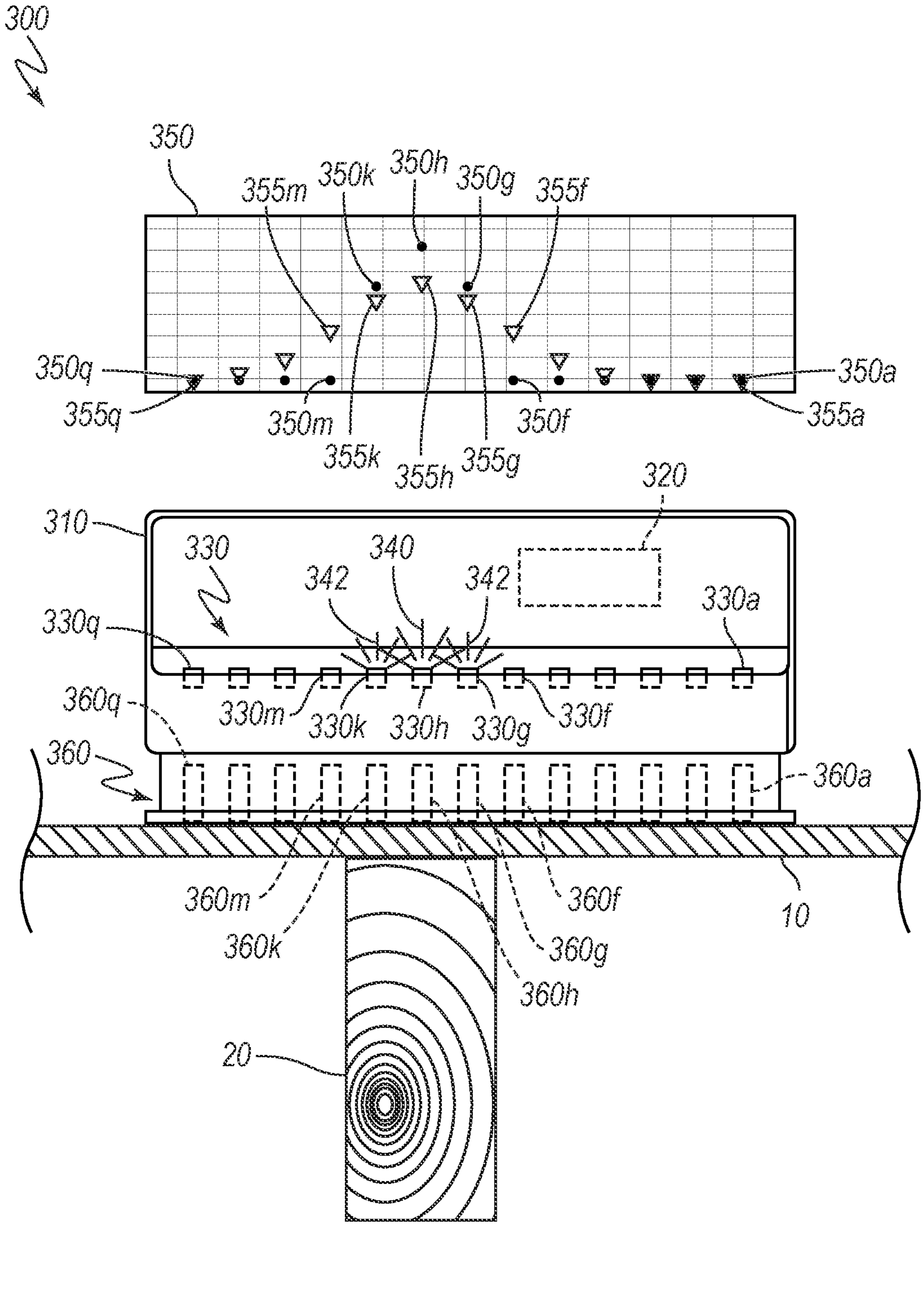
FIG. 3 is a top view of an OFDS, wherein the OFD is configured to provide an amplified output at the display.

FIG. 3 depicts an OFDS 300, according to another embodiment of the present disclosure. The OFDS may resembles the OFDS 200 of FIG. 2 in certain respects. Accordingly, like features are designated with like reference numerals, with the leading digit(s) incremented to "3." For example, the embodiment depicted in FIG. 3 includes a controller 320 that may, in some respects, resemble the controller 220 of FIGS. 2A-2B. Relevant disclosure set forth above regarding similarly identified features thus may not be repeated hereafter. Moreover, specific features of the OFDS 200 and related components shown in FIGS. 2A-2B may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the OFDS 300 and related components depicted in FIG. 3. Any suitable combination of the features, and variation of the same, described with respect to the OFDS 200 and related components illustrated in FIGS. 2A-2B can be employed with the OFDS 300 and related components of FIG. 3, and vice versa. This pattern of disclosure applies equally to further embodiments depicted in subsequent figures and described hereafter, wherein the leading digits may be further incremented.

FIG. 3 is a top view of an OFDS 300, according to an embodiment of the present disclosure, wherein the OFD 310 is configured to provide an amplified output at the variable output display 330. A wallboard 10 and an obscured feature 20 are shown, diagrammatically, for reference. The OFD 310 may, in some respects, be similar to the OFD 100, 210 of, respectively, FIGS. 1A-2B. The OFD 310 comprises the controller 320, a display 330, and a sensor array 360. The variable output display 330 comprises a plurality of LEDs 330*a*-330*q*. Each LED 330*a*-330*q* of the variable output display 330 corresponds to a sensor element 360*a*-360*q* of the sensor array 360.

The sensor element 360*h* is located over or nearly over a center of the obscured feature 20 and sends to the controller 320 a signal having a first signal strength. The sensor elements 360*g*, 360*k* are located over a portion of the obscured feature 20 between a center and an edge of the obscured feature 20 and each sends to the controller 320 a signal having a second signal strength less than the first signal strength. The sensor elements 360*f*, 360*m* are located near but not over the obscured feature 20 and each sends to the controller 320 a signal having a third signal strength less than the second signal strength. Other sensor elements of the sensor array 360 may send signals to the controller 320 having a signal strength diminishing from the third signal strength relative to the distance of the particular sensor element from the obscured feature 20.

The controller 320 may include or otherwise implement an amplification mode that may employ an algorithm to meaningfully skew (to increase or amplify, or decrease or de-amplify) the output at the variable output display 330 to provide a clearer indication to a user of the OFD 310 of the disposition of the obscured feature 20. In other words, the LEDs 330*a*-330*q* or the variable output display 330 may vary in a manner that is non-linear to the strength of the sensor reading. The controller 320 may algorithmically cause an increased or decreased power state 350*a*-350*q* to be sent to each LED 330*a*-330*q*. In the power table 350, a first unaltered power state 355*a* is shown along with a first skewed power state 350*a*. The first unaltered power state 355*a* represents the power state that the controller 320 would send to first LED 330*a* when the OFD 310 is set in a non-amplification mode. Each of the sensor elements 360*a*-360*q* produces a signal strength corresponding to a position of the sensor element 360*a*-360*q* relative to the obscured feature 20. The controller 320, in a non-amplification mode, would send a power state 355*a*-355*q* to each corresponding LED 330*a*-330*q*. In an amplification mode, the controller 320 sends a power state 350*a*-350*q* to each corresponding LED 330*a*-330*q*. The difference between each power state pair (as indicated by the letter suffix) may be based on one or more thresholds of the controller 320. Below a threshold, the altered power state 350*a*-350*q* is diminished to reduce a luminance at each corresponding LED 330*a*-330*q*. Above the threshold, the altered power state 350*a*-350*q* may be increased (amplified) by an algorithmically determined amount. The algorithmically determined amount may be fixed difference or a relative difference. In one embodiment, the controller 320, in the amplification mode, may be configured to employ multiple thresholds whereby greater amplification may be employed. In such an embodiment, the threshold described above may be a first threshold and a second threshold may be greater than the first threshold. Below a second threshold and above the first threshold the altered power state 350*a*-350*q* may result from a first algorithm, a first algorithm function, a first algorithm variable, etc., while above the second threshold may employ a different algorithm, algorithm function, algorithm variable, etc. to produce an altered power state 350*a*-350*q* having a greater excursion from the unaltered power state 355*a*-355*q*.

By way of non-limiting example, the unaltered power states 355*a*-355*f*, 355*m*-355*q* fall below a threshold and the controller 320 generates a lower altered power state 350*a*-350*f*, 350*m*-350*q*. The unaltered power states 355*g*-355*k*, conversely, are above the threshold and the controller 320 generates a higher altered power state 350*g*-350*k*. The LEDs 330*a*-330*q* are then energized (or not energized) according to the corresponding higher or lower altered power state 350*a*-350*q*. The sensor element 360*h*, being located over or near the center of the obscured feature 20, sends signal having the first signal strength to the controller 320. The corresponding unaltered power state 355*h* is above the threshold and the controller 320 increases (amplifies) to a higher altered power state 350*h*, resulting in a first luminance 340 at the LED 330*h*. Similarly, the location of the sensor elements 360*g*, 360*k* generate a second signal strength signal to the controller 320, where the unaltered power state 355*g*, 355*k* is above the threshold and an amplified (higher) power state 350*g*, 350*k* results in the second luminance 342 at the LEDs 330*g*, 330*k*. All other sensor elements 360*a*-360*q* result in unaltered power states 355*a*-355*f*, 355*m*-355*q* below the threshold. The controller 320 selects a lower altered power state 350*a*-350*f*, 350*m*-355*q* for each of the corresponding LEDs 330*a*-330*f*, 330*m*-330*q*.

Figure 4:
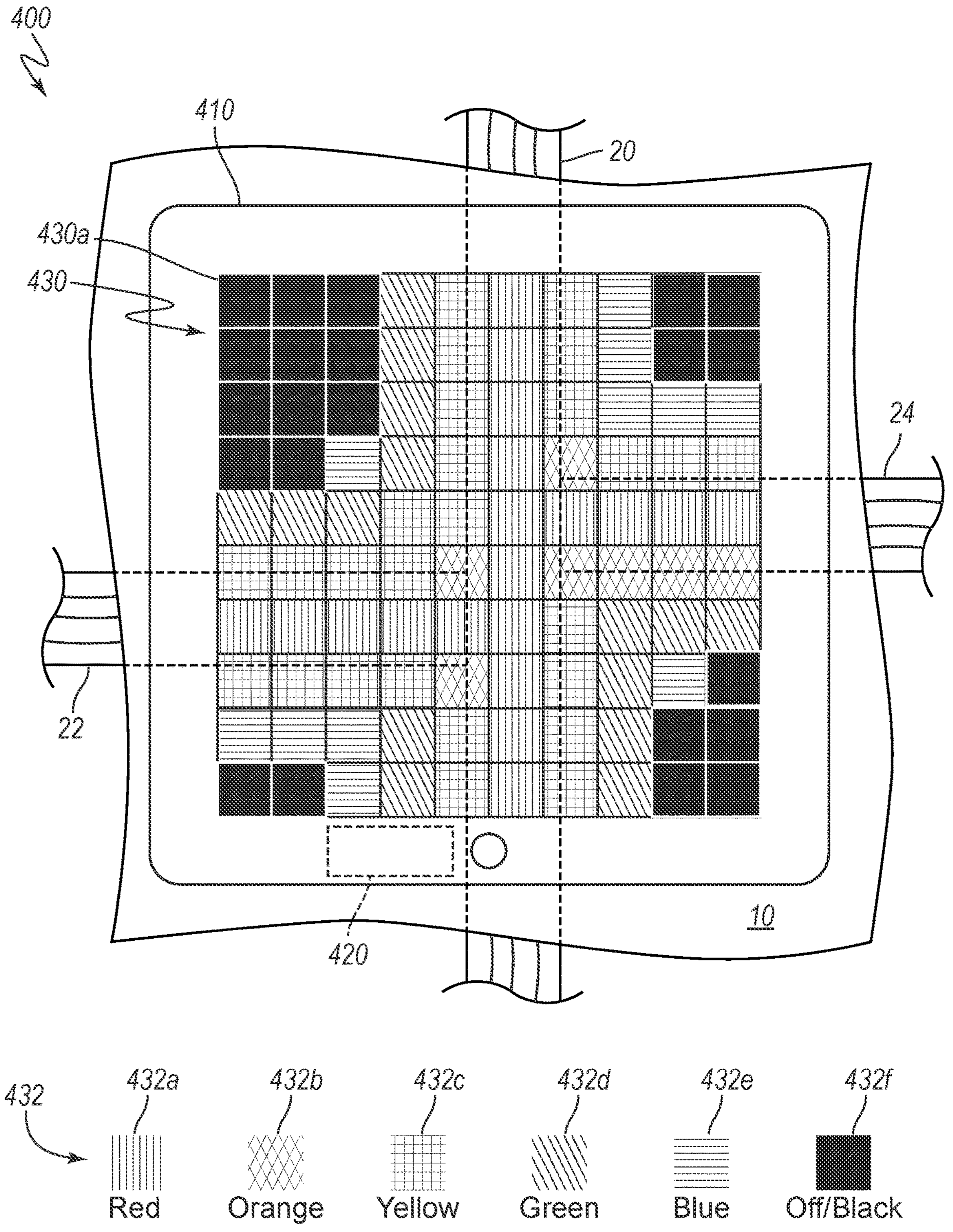
FIG. 4 is a plan view of an OFDS, wherein the OFD 410 comprises a display array.

FIG. 4 is a plan view of an OFDS 400, according to an embodiment of the present disclosure, wherein the OFD 410 comprises a display array 430. The OFD 410 is located at a wallboard 10 and located over a plurality of intersecting obscured features 20, 22, 24. The OFD 410 may include a controller 420, which may be similar, in some respects, to the controller 220, 320 of FIGS. 2A-3, respectively. The variable output display array 430 comprises a plurality of variable output display elements, of which a first variable output display element 430*a* is identified for reference. In one embodiment, each variable output display element is component capable of emitting colored light, such as an LED. In one embodiment, each variable output display element may further be capable of rendering the colored light at varying intensities (luminosity). The OFD 410 comprises a sensor array. In one embodiment, the sensor array may comprise one sensor element corresponding to each variable output display element. In one embodiment, the sensor array may couple or otherwise employ more or less than one sensor element for each display element. The variable output display array 430 is capable of rendering color output. The controller 420 may be configured to receive a signal from each sensor element wherein the signal from each sensor element may have a different signal strength.

The controller 420 may further be configured to generate a control signal to for use at the variable output display array 430. More particularly, the variable output display element of the variable output display array 430 may vary by changing in color. A key 432 indicates a principal color which may be rendered at each variable output display element of the variable output display array 430 based on the position of the OFD 410 relative to the intersecting obscured features 20-24. The colors used here are but one of many variations of colors that may be used. More particularly, the principal color rendered at each variable output display element derives from a sensor reading of the corresponding sensor element(s), with respect to the obscured features 20-24, as received at the controller 420. In other words, each variable output display element provides an output that represents a position relative to the obscured features 20-24 with that output derived from a signal generated at a corresponding sensor element. Visually, each variable output display element represents a location relative to the obscured features 20-24. Variable output display elements disposed wholly and directly over a central portion of the obscured features 20-24 may be energized to produce, e.g., a red color 432*a*. The color displayed at a particular variable output display element of the variable output display array 430 is determined by the controller 420 based on the signal received from each corresponding sensor element. Variable output display elements disposed partially over a more lateral portion of any of the obscured features 20-24 may be energized to produce, e.g., an orange color 432*b*. Variable output display elements representing positions progressively further from a midpoint or midline of the obscured features 20-24 may render additional colors, such as, e.g., yellow 432*c*, green 432*d*, and blue 432*e*. Some variable output display elements may render no color (not be energized) or a dark color to indicate a degree of remoteness to the obscured features 20-24. The colors 432 used in the foregoing description may topologically present a form of the obscured features 20-24 in a "heat map" or similar fashion. Other colors 432 or combinations of colors may be used equally well.

It should be noted that FIG. 4 illustrates a display array 430 which is physically integrated with or otherwise coupled to the OFD 410; however, this is for convenience of the disclosure and not by way of limitation. The variable output display array 430 may be physically separate from and electronically coupled to the OFD 410. For example, the variable output display array 430 may be a display of a smartphone, a tablet computer, etc., that is coupled to the OFD 410 by means of a network connection, a wireless network connection, a Bluetooth® connection, etc. An application programming interface ("API") or an application may facilitate operating the variable output display array of the smartphone, tablet computer, etc.

Figure 5:
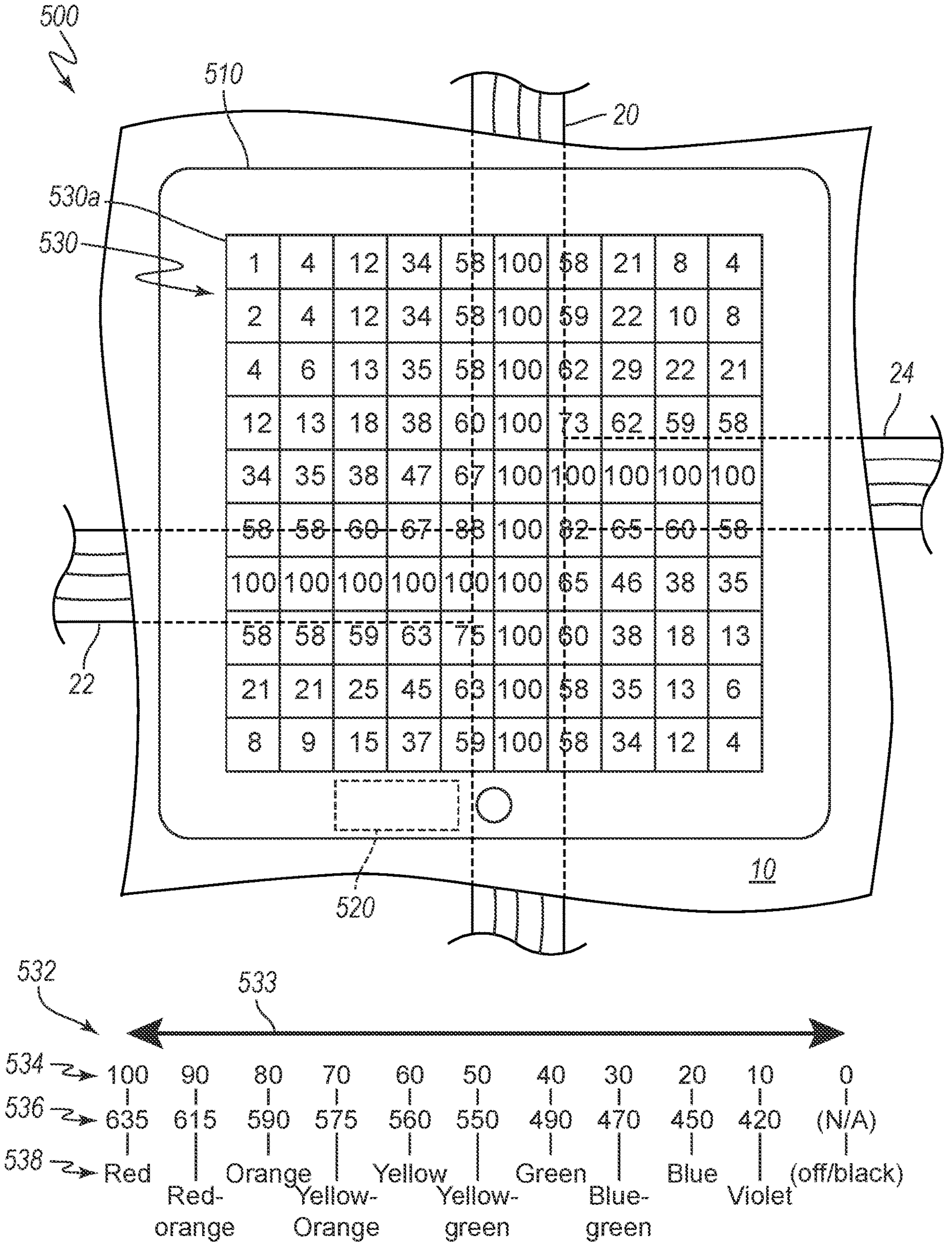
FIG. 5 is a top view of an OFDS, similar in at least some respects to the OFDS of FIG. 4 and illustrating alternate display modes.

FIG. 5 is a top view of an OFDS 500, according to an embodiment of the present disclosure, and illustrating alternate display modes. The OFDS 500 may be similar in at least some respects to the OFDS 400 of FIG. 4. The OFDS 500 comprises an OFD 510, which may be similar in some respects to the OFD 410 of FIG. 4. The OFD 510 is disposed at a wallboard 10 and over a plurality of intersecting obscured features 20, 22, 24. The OFD 510 comprises a display array 530. The variable output display array 530 comprises a plurality of variable output display elements with a first variable output display element 530*a* identified. The variable output display array 530 is illustrated as an integral component to the OFD 510. In one embodiment, the variable output display array 530 may be remote to the OFD 510 as a physically distinct component, or may be a display of a smartphone, a table computer, or other device. In one embodiment, each variable output display element is a component capable of emitting colored light, such as an LED. In one embodiment, each variable output display element may alternatively or in addition be capable of rendering the colored light at varying intensities (luminosity). Each variable output display element may be a single element (e.g., a single LED, a single LCD element, etc.) or may be composite of multiple elements (e.g., a plurality of LEDs, a plurality of LCD elements, etc.).

Each variable output display element of the variable output display array 530 is shown with a numerical value within the variable output display element. The numerical values, as illustrated, range from 1 to 100. The range of 1 to 100 is for convenience of the disclosure and not by way of limitation. Each numerical value corresponds to control signal from the controller 520 and is related to a signal strength received at the controller 520 from a sensor element (or sensor elements) corresponding to the particular variable output display element. In one embodiment, each variable output display element may be energized with a luminance corresponding to the numerical value shown at the respective variable output display element. Said otherwise, a variable output display element shown with a numerical value of 100 receives from the controller 520 a control signal causing or directing the variable output display element to have a maximum luminance. Each numerical value less than 100 results in the corresponding variable output display element receiving a control signal from the controller 520 directing or causing the relevant variable output display element to have lesser luminance. As may be appreciated, the range of numerical values 1 to 100 may represent a continuum of luminance and a particular luminance corresponds to a particular numerical value whereby lesser numerical values result in appropriately lesser luminance at the relevant variable output display element.

In one embodiment, the numerical values at the variable output display elements correspond to a color emitted by the relevant variable output display element. A scale 532 serves as a key correlating a color to each numerical value. The scale 532 comprises a reference 534 to the numerical values at the variable output display elements, a color designator 536 in nanometer wavelength for each color, and a corresponding nominal color 538. In one embodiment, the available colors displayable at the variable output display elements may be limited to the named colors of the nominal colors 538. In one embodiment, the available colors displayable at the variable output display elements may comprise more than the named colors of the nominal colors 538, and conceivable comprise all colors represented at the nanometer wavelength color designator 536. In other words, the displayable colors may be on a continuum 533 spanning a major portion or all of the visible light spectrum.

In one embodiment, the OFD 510 may be configured to discern discrete differences in the material or other significant characteristic of each of the obscured features 20-24. In other words, the OFD 510 may be able to differentiate between a wire and a stud based on differences between the wire and the stud detectable via the sensor array. In such an embodiment, the controller 520 may deliver a control signal to each variable output display element directing or causing a collection of the variable output display elements to render one obscured feature in a limited range of colors (a select subset of colors) and/or luminance, and another obscured feature in a different range of colors (a disparate subset of colors) and/or luminance whereby a user of the OFD 510 may readily discern not only the location of the obscured features 20-24, but also a nature of the obscured features 20-24. By way of non-limiting example, should the OFD 510 be placed at a location of the working side of a wallboard 10 overlying a wooden stud supporting an electrical box and being penetrated by an electrical wire, the wooden stud may be represented by a first subset of colors and/or luminance, the electrical box by a second subset of colors and/or luminance, and the electrical wire by a third subset of colors and/or luminance. In one embodiment, the electrical box and the electrical wire, being closely related, may be represented by the same subset of colors and/or luminance.

The number and arrangement of the various display elements of the variable output display array 530 is for convenience of the disclosure only and not by way of limitation. The present disclosure anticipates an OFD 510 having more or fewer variable output display elements at the variable output display array 530.

Figure 6:
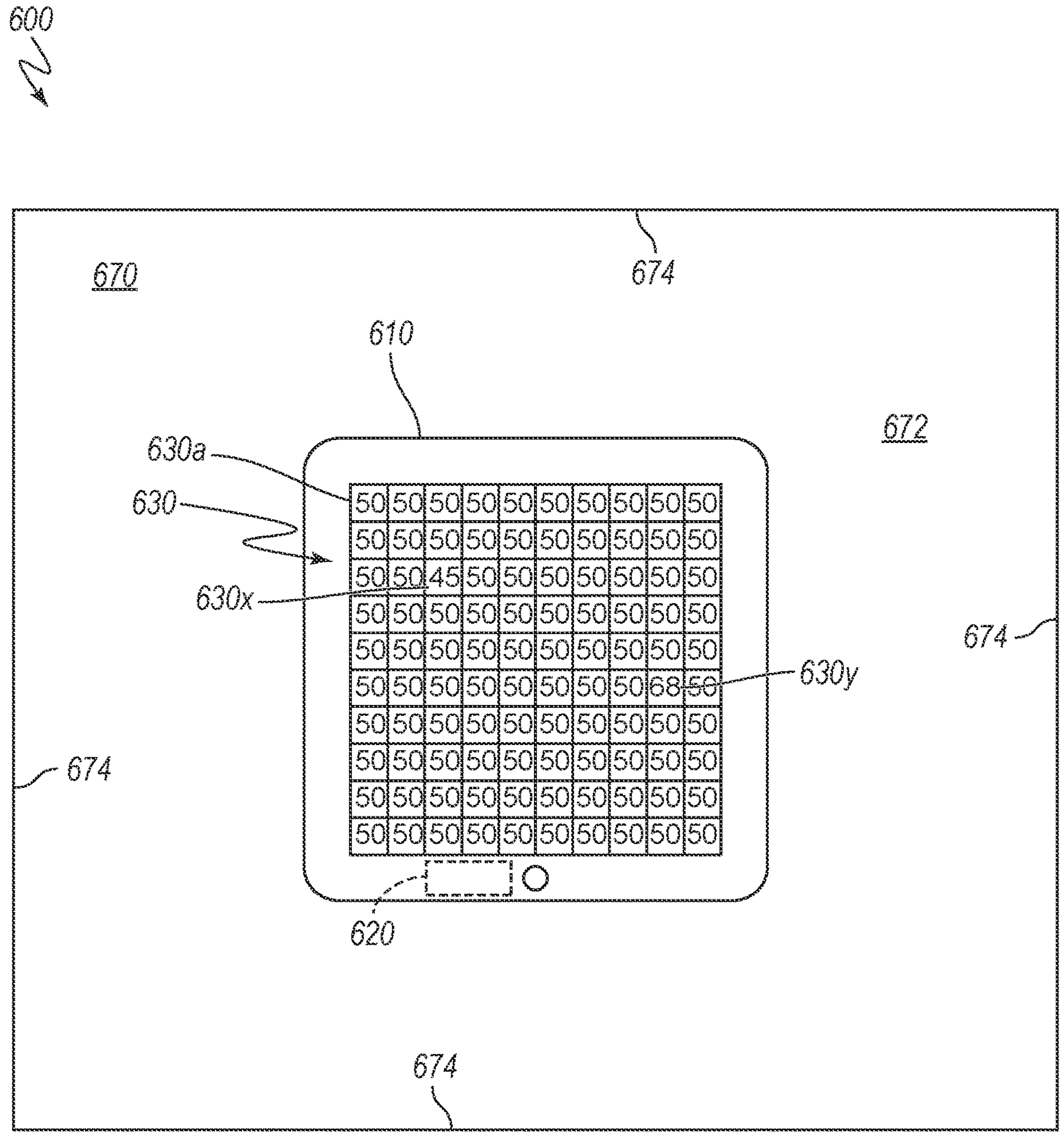
FIG. 6 is a plan view of an OFDS similar in at least some respects to the OFDSs of FIGS. 1A-5, wherein an OFD is disposed at a calibration table.

FIG. 6 is a plan view of an OFDS 600 similar in at least some respects to the OFDSs 200, 300, 400, 500 of FIGS. 2A-5, according to an embodiment of the present disclosure, wherein an OFD 610 is disposed at a calibration table 670. The controller 620 may determine calibration values for each sensor element. The OFD 610 comprises a display array 630. The variable output display array 630 includes a plurality of variable output display elements, of which a first variable display array 630*a* is identified. The OFD 610 is disposed at or placed on a surface 672 of the calibration table 670 a minimum distance from each side 674 of the calibration table 670. The surface 672 of the calibration table 670 comprises a material of a density and thickness particularly configured to result in a known common signal strength value (common value) at each sensor element. Calibration of the OFD 610 involves performing a respective capacitance sensor reading on each of the sensor elements of the OFD 610 on the surface 672. Each sensor element provides a respective capacitance sensor reading. Where the respective capacitance sensor reading differs from the common value, the difference is calculated (as by subtraction) to determine a calibration value for the particular sensor element. The calibration value for each sensor element is stored by the controller 620 at a memory. In one embodiment, the memory is a non-transitory memory. In one embodiment, the memory may be a transitory memory. A numerical value is illustrated at each of the variable output display elements. While the numerical values are shown at each of the variable output display elements of the variable output display array, during calibration, the controller 620 may be coupled to an external device enabling a direct reading of signal strength provided by each corresponding sensor element. For convenience of the disclosure, the signal strengths are shown at the variable output display elements. One variable output display element 630*x* shows a signal strength of 45, indicating the corresponding sensor element is sending to the controller 620 a signal having a signal strength less than the target signal strength 50. One variable output display element 630*y* shows a signal strength of 68, indicating the corresponding sensor element is sending to the controller 620 a signal having a signal strength higher than the target signal strength 50. While in the calibration mode, the controller 620 may be particularly configured to adjust for the lower signal strength shown at the variable output display element 630*x*, and for the higher signal strength shown at the variable output display element 630*y*. Calibration may be repeated to establish a reliable deviation at each sensor element, or to identify a varying deviation that indicates a defective and/or unreliable sensor element. Calibration may also be performed at more than one calibration table 670 to calibrate the controller 620 for a variety of conditions, materials, characteristics, etc. In some embodiments calibration may optionally be performed on the wall at each power up. In conjunction with the variable display capability of the OFD 610, calibration of the controller 620 may enable the OFDS 600 to avoid the false positives and negatives of current obscured feature detectors.

Figure 7A:
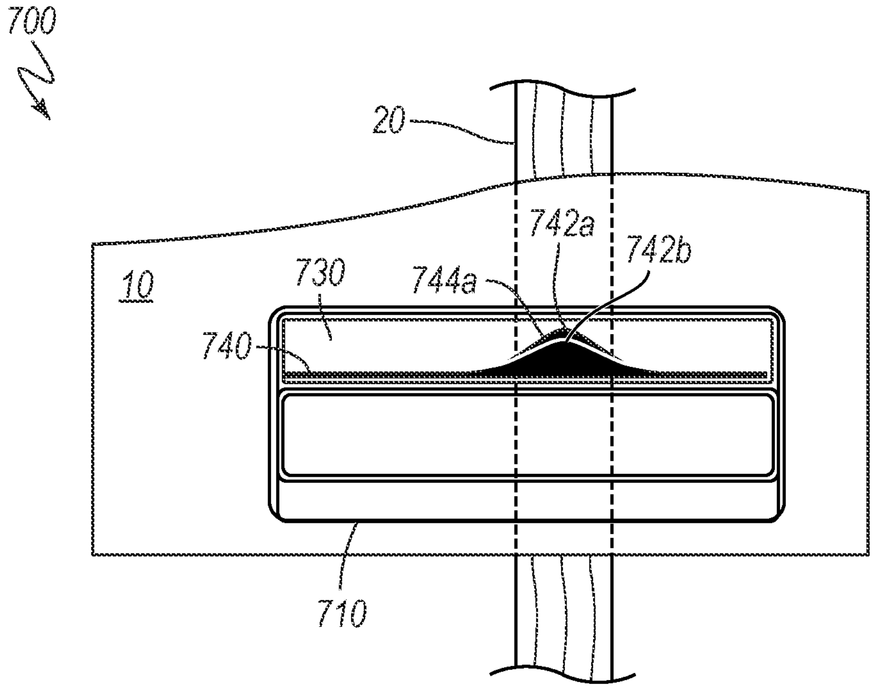
FIG. 7A is a plan view of an OFDS, similar in some respects to the OFDSs of FIGS. 1A-6, wherein the OFD has a variable display capable of rendering variously sized and shaped representations.
Figure 7B:
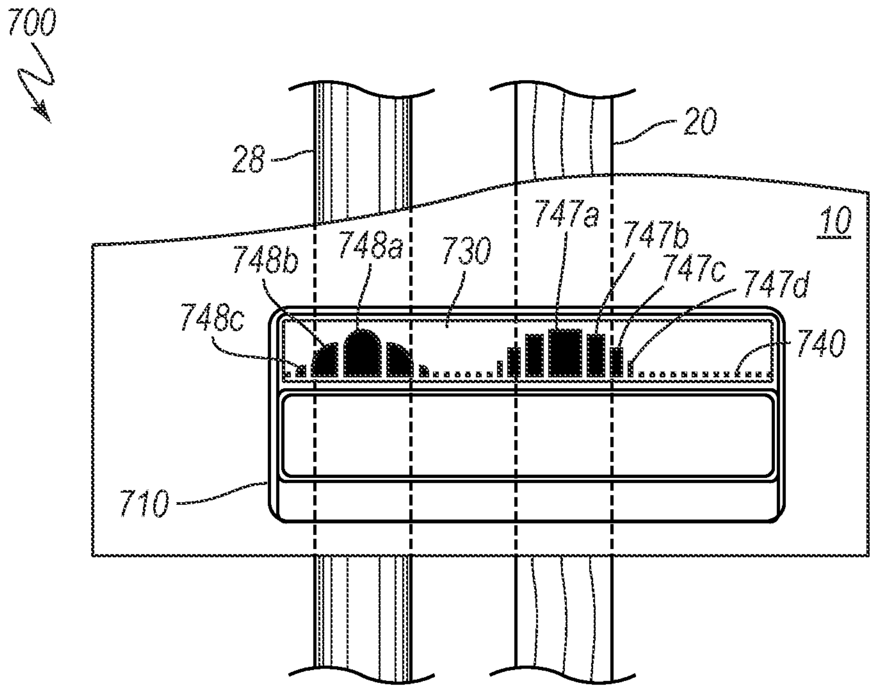
FIG. 7B is a plan view of the OFDS of FIG. 7A, wherein the OFD has a variable display capable of rendering variously sized and shaped representations.

FIGS. 7A and 7B are plan views of an OFDS 700, according to an embodiment of the present disclosure. The OFDS 700 may be similar in some respects to the OFDSs 200, 300, 400, 500, 600 of FIGS. 2A-6. The OFDS 700 may include an OFD 710 that has a variable display 730 capable of rendering variously sized and shaped representations. In other words, the variable display 730 may produce an output rendering that varies by changing in size. The variable display 730 comprise an array of LEDs, an LCD module, or other means of rendering a variable output. The OFD 710 is disposed at a wallboard 10.

In FIG. 7A, the OFD 710 is positioned over an obscured feature 20. The variable display 730 is rendering a representation of a curve 740. A peak 742*a* of the curve 740 may represent a location over or nearly over a center of the obscured feature 20. A slope 744*a* of the curve 740 may represent increasing distance from the center of the obscured feature 20. The variable display 730 is capable of rendering a curve 740 having variable height and width of that portion of the curve 740 representing a position and/or form of the underlying obscured feature 20. For example, a lower peak 742*a* may suggest the obscured feature 20 is composed of a less dense material than would result in the peak 742*a*. A lower peak 742*b* may indicate the obscured feature 20 is more distant from the OFD 710 than indicated by the peak 742*a*.

In FIG. 7B, the OFD 710 is disposed over a first obscured feature 20 and a second obscured feature 28. The first and second obscured features 20, 28 may be different features. In the illustrated example, the first obscured feature 20 may be wooden feature, such as a wall stud, while the second obscured feature 28 may be plumbing feature, such as a pipe. For convenience of the disclosure, the first and second obscured features 20, 28 are hereafter referred to respectively as a stud 20 and a pipe 28. That portion of the variable display 730 disposed over the stud 20 presents a series of rectangles 747*a*-747*d*. The largest rectangle 747*a* having the greatest size may represent a location over or nearly over the center of the stud 20. The second largest rectangle 747*b* may represent a location between the center of the stud 20 and a side of the stud 20. The third largest rectangle 747*c* may represent a location at a side of the stud 20. The fourth largest rectangle 747*d* may represent a location near a side of, but not over the stud 20. A smallest rectangle 740 may represent a baseline output indicating (a) the OFD 710 is operating and (b) no obscured feature is detected in that area of the display.

The portion of the variable display 730 disposed over the pipe 28 presents partially curved rectangles 748*a*-748*c*. Disposed over or nearly over the center of the pipe 28 is a first partially curved rectangle 748*a* having a semicircle at the upper portion of the rectangle, suggesting the form of a pipe or other rounded architectural feature. Adjacent the first partially curved rectangle 748*a* is a second partially curved rectangle 748*b* smaller (shorter) than the first partially curved rectangle 748*a* and having a quarter circle in place of an upper corner of the second partially curved rectangle 748*b* that is distal to the first partially curved rectangle 748*a*, suggesting the location is over a portion of the pipe 20 with the pipe wall curving away from the wallboard 10. The second partially curved rectangle 748*b* is mirrored at the opposite side of the first partially curved rectangle 748*a*. Adjacent the second partially curved rectangle 748*b* is a third partially curved rectangle 748*c* smaller (shorter) than the second partially curved rectangle 748*b* and has a similar quarter circle in place of an upper corner of the rectangle that is distal to the second partially curved rectangle 748*b*.

The shapes of the rectangles 747*a*-747*d* indicate the obscured feature 20 is likely rectilinear, such as, e.g., a stud, an electrical box, etc. The shapes of the partially curved rectangles 748*a*-748*c* indicate the obscured feature 28 is rounded or generally circular with a portion nearer the wallboard 20 and the sides receding away from the wallboard 20, such as, e.g., a pipe, a conduit, etc. The rectangles and partially curved rectangles 747*a*-748*c* are illustrated by way of non-limiting examples, and the present disclosure anticipates other shapes may be rendered to represent various shapes, composing materials, gaps, etc., of an obscured feature 20, 28 within or behind the wallboard 10.

Of note, an OFDS may be configured whereby the controller switches or toggles the variable output display between a binary mode (e.g., as described in conjunction with FIG. 2B) and a variable mode (e.g., as described in conjunction with FIG. 3). Similarly, in the embodiments described in conjunction with FIGS. 4 and 5 may likewise enable toggling from a binary mode to a variable mode and vice versa. Furthermore, in one embodiment, the display elements of the variable output display may be configured or configurable to display in both binary and variable mode simultaneously. In one embodiment, the OFDS may be configured to permit a user to select to employ the display elements of the variable output display a binary or variable display mode, or a combined binary and variable display mode. In one embodiment, the OFDS may be configured whereby the controller determines, based on one or more pre-defined conditions, to operate the display elements of the variable output display in a binary mode or a variable, or in a combined binary and variable mode.

Figure 8:
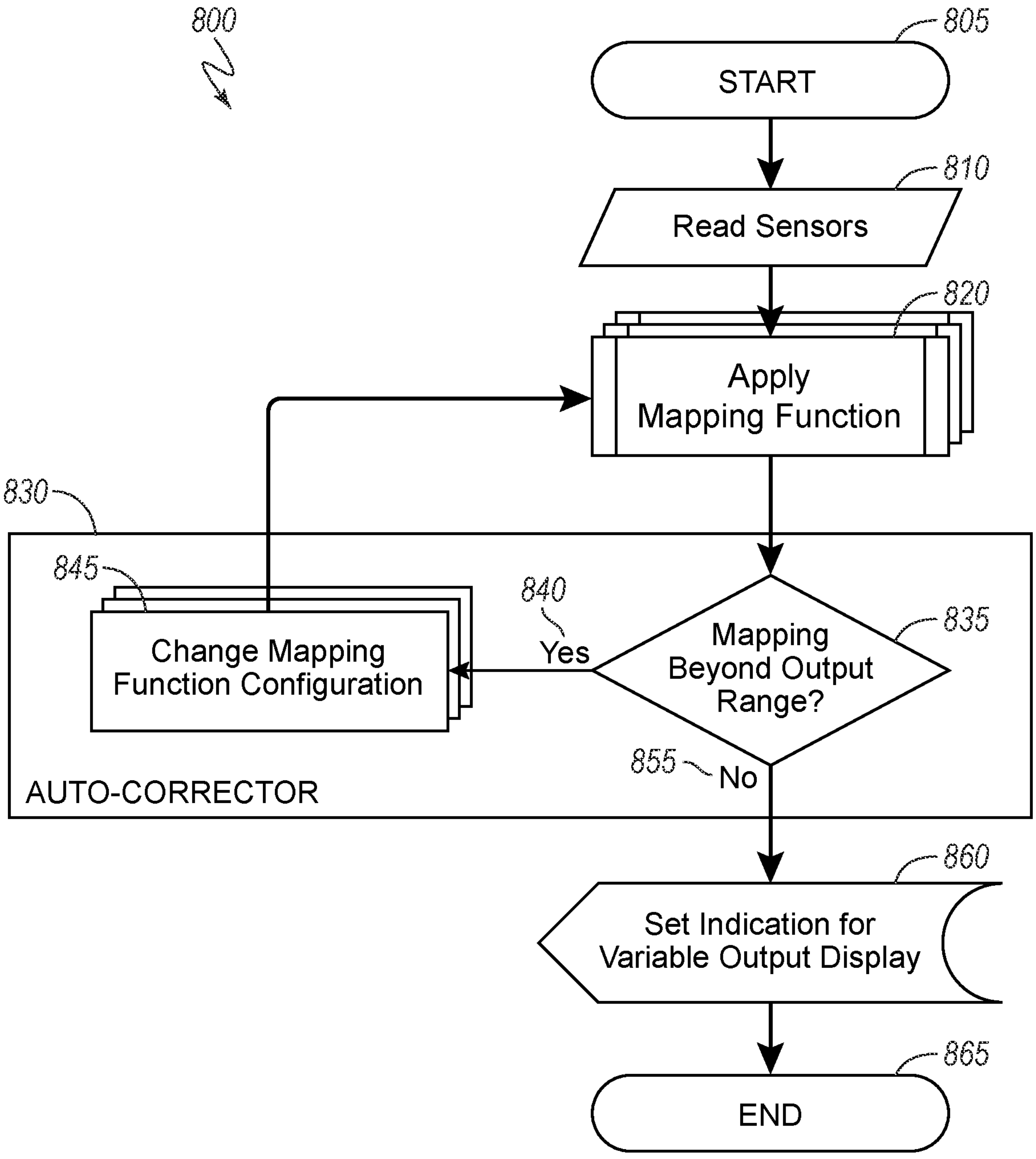
FIG. 8 is a flowchart of a method for providing a variable output display, according to an embodiment of the present disclosure.

FIG. 8 is a flowchart of a method 800 for providing a variable output display, according to an embodiment of the present disclosure. The method 800 may be implemented or otherwise performed by an obscured feature detection system (OFDS), such as the OFDSs 110, 210, 310, 410, 510, 610, 710 of FIGS. 1A-7B, according to an embodiment of the present disclosure. The method 800 starts 805 and reads 810 the sensors of the OFD. Reading 810 the sensors may comprise reading a list of sensing elements and, for each sensing element, reading the sensor element to acquire a detection signal (including, potentially, an absence of detection, a degree of detection (e.g., a signal strength of capacitance at the sensor element), etc.). The method 800 entails applying 820 one or more mapping functions based on a mapping function configuration (MFC). The MFC may configure possible adjustable parameters to one or more mapping functions and may specify which mapping functions are applied to combinations of sensor readings for each variable output display element. Determining the MFC may comprise reading a list of variable output display elements, then acquiring a MFC for each variable output display element. Each MFC may be acquired from volatile or non-volatile memory or may be created. Based on the MFC, one or more mapping functions is performed 820 to determine a potential output for each respective variable output display element. The potential output is based on the detection signal from a coordinate sensor element. Said otherwise, the one or more mapping functions may configure or control the respective variable output display element to render a particular output (e.g., a color, a brightness, a flash/flash rate, etc.). The potential output from the one or more mapping functions may be outside a range of output capability of the respective variable output display element. Auto-correction is applied 830 to determine 835 if, at any of the variable output display elements, the potential output exceeds or falls outside a capacity of the particular variable output display element. If yes 840, a potential output for any of the variable output display elements exceeds the capacity of the particular variable output display element to render an output, the MFC is changed 845. Changing 845 the MFC may be an iterative process whereby a new MFC is produced for each of the variable output display elements to ensure the aggregate output of the variable output display elements provides relevant relative indication of detection of an obscured feature.

Changing 845 the MFC may comprise acquiring a list of mapping functions available to the variable output display element and, for each available mapping function, optionally changing the MFC. Changing 845 the MFC may also comprise creating a new mapping function or removing an existing mapping function from use with a given variable output display element. Changing 845 may also comprise saving the MFC to volatile or non-volatile memory. Once the MFC change 845 is complete, the method 800 returns to applying 820 the one or more mapping functions. When no 855, the potential output does not exceed or fall outside a capacity of each variable output display element, a variable output display element strength of indications is set 860. The strength of indications configures the variable output display elements to each indicate a strength of indication of a detection of an obscured feature at (or near) the coordinate sensor element. Setting 860 the variable output display element strength of indication may comprise acquiring and applying any limit corrections to mapping of the output to the each of the variable output display elements. The output is then rendered via the variable output display elements and the method 800 ends 865. The method 800 may, or course, be an ongoing iterative process as the OFD is moved across a surface. In other words, the method 800 may start 805 when the OFD is turned on, or placed at a surface, etc., and may iterate until an end 865 state is achieved (e.g., the OFD is switched off, lifted from the surface, etc.).

Examples

Some examples of embodiments of the present disclosure are provided below.

Example 1. A display for an obscured feature detector, comprising: one or more variable output display elements each to display indication of a strength of a sensor reading from one or more sensing elements of an obscured feature detector, based on input (e.g., a signal received) from, or a read out provided by, the one or more sensing elements; and a controller to activate the variable output display elements to drive display of the indication of the strength of the sensor reading from the one or more sensing elements, wherein the controller is coupled to the one or mare variable output display elements and is to couple to the one or more sensing elements of the obscured feature detector. The variable output display elements can have three or more output states to provide variable display according to the strength of a corresponding sensor reading. The variable output display elements can have a plurality of activated states (in addition to a deactivated state) to provide variable display according to the strength of a corresponding sensor reading.

Example 2. The variable output display of example 1, wherein the controller provides a calibration in conjunction with the sensing elements.

Example 3. The variable output display of example 1, wherein each of the one or more variable output display elements varies by changing in brightness.

Example 4. The variable output display of example 1, wherein each of the one or more variable output display elements varies by utilizing or displaying, or otherwise presenting different colors.

Example 5. The variable output display of example 1, wherein each of the one or more variable output display elements varies by changing in size.

Example 6. The variable output display of example 1, wherein each of the one or more variable output display elements varies by changing in shape.

Example 7. The variable output display of example 1, wherein each of the one or more variable output display elements varies in direct proportion to the strength of the sensor reading.

Example 8. The variable output display of example 1, wherein each of the one or more variable output display elements varies in a manner non-linear to the strength of the sensor reading.

Example 9. The variable output display of example 1, wherein each of the one or more variable output display elements may switch between a binary mode, and a variable mode.

Example 10. The variable output display of example 1, wherein the variable output of each of the variable output display elements may be one of more of strength and intensity.

Example 11. An obscured feature detector, comprising: one or more sensing elements to detect an obscured feature and provide a sensor reading having a varying signal strength that is based on one or more properties an obscured feature and that varies corresponding to a level or likelihood of detection of the obscured feature; one or more variable output display elements each to display indication of a sensor reading from (or a detected signal strength of) a sensor element of the one or more sensor elements; and a controller to activate the one or more variable output display elements to drive a variable output display that corresponds to (and thereby indicates) the sensor reading from (or the signal strength of) the one or more sensing elements, the controller coupled to the one or more sensing elements and coupled to the one or more variable output display elements (e.g., the controller coupling the one or more sensing element to the one or more variable output display elements).

Example 12. A display for an obscured feature detector, comprising: one or more variable output display elements each to display indication of a strength of a capacitance sensor reading from one or more sensing elements of an obscured feature detector, based on input from the one or more sensing elements; and a controller to activate the variable output display elements to drive display of the indication of the strength of the capacitance sensor reading from the one or more sensing elements, wherein the controller is coupled to the one or more variable output display elements and is to couple to the one or more sensing elements of the obscured feature detector.

Example 13. The display of example 12, wherein the controller determines calibration values for the one or more sensing elements.

Example 14. The display of example 13, wherein the controller determines the calibration values by: placing the obscured feature detector on a surface, performing a respective capacitance sensor reading on the one or more sensing elements of the obscured feature detector on the surface, calculating each of the calibration values by subtracting the respective capacitance sensor reading from a common value, and storing the calibration value for each of the one or more sensing elements in memory.

Example 15. The display of example 13, wherein the controller determines the calibration values by: performing a capacitance sensor reading on the one or more sensing elements of the obscured feature detector, determining the calibration values by subtracting each of the capacitance sensor readings from a common value, and storing a calibration value for each of the one or more sensing elements in memory.

Example 16. The display of example 14, wherein the calibration values are stored in a non-volatile memory.

Example 17. The display of example 14, wherein the calibration values are stored in a volatile memory.

Example 18. The display of example 13, wherein the one or more variable output display elements varies by changing in brightness.

Example 19. The display of example 13, wherein the one or more variable output display elements varies by changing in color.

Example 20. The display of example 13, wherein the one or more variable output display elements varies by one or more of: utilizing different colors; displaying different colors; and presenting different colors.

Example 21. The display of example 13, wherein the one or more variable output display elements varies by changing in size.

Example 22. The display of example 13, wherein the one or more variable output display elements varies by changing in shape.

Example 23. The display of example 13, wherein the one or more variable output display elements varies in direct proportion to the strength of the sensor reading.

Example 24. The display of example 13, wherein each of the one or more variable output display elements varies in a manner non-linear to the strength of the sensor reading.

Example 25. The display of example 13, wherein the variable output of each of the variable output display elements may be one or more of strength and intensity.

Example 26. The display of example 13, wherein the one or more variable output display elements can display in one or more of a binary mode and a variable mode.

Example 27. The display of example 26, wherein the one or more variable output display elements display in both binary and variable mode simultaneously.

Example 28. The display of example 26, configured so that the user can select between the binary mode or the variable mode.

Example 29. The display of example 26, wherein the controller determines whether the one or more variable output display elements display in variable mode or binary mode.

Example 30. The display of example 12, wherein the one or more variable output display elements comprise an array of LEDs.

Example 31. The display of example 12, wherein the controller is configured to activate the display indication with more than one level of sensitivity.

Example 32. The display of example 12, configured such that the user can manually adjust the sensitivity of the display indication.

Example 33. The display of example 12, wherein the one or more variable output display elements and the controller are contained within the same housing.

Example 34. An obscured feature detector, comprising: one or more sensing elements to detect an obscured feature and provide a capacitance sensor reading that is based on one or more properties an obscured feature and that varies corresponding to a level or likelihood of detection of the obscured feature; one or more variable output display elements each to display indication of one or more capacitance sensor readings from the one or more sensor elements; and a controller to activate the one or more variable output display elements to drive a variable output display, the controller coupled to the one or more sensing elements and coupled to the one or more variable output display elements.

Example 35. The obscured feature detector of example 34, wherein the controller determines calibration values for each of the one or more sensing elements.

Example 36. The obscured feature detector of example 34, wherein the controller determines the calibration values by: placing the obscured feature detector on a surface, performing a respective capacitance sensor reading on the one or more sensing elements of the obscured feature detector on the surface, calculating each of the calibration values by subtracting the respective capacitance sensor reading from a common value, and storing the calibration value for each of the one or more sensing elements in memory.

Example 37. The obscured feature detector of example 36, wherein the calibration values are stored in a non-volatile memory.

Example 38. The obscured feature detector of example 36, wherein the calibration values are stored in a volatile memory.

Example 39. The obscured feature detector of example 34, wherein the one or more variable output display elements varies by changing in brightness.

Example 40. The obscured feature detector of example 34, wherein the one or more variable output display elements varies by changing in color.

Example 41. The obscured feature detector of example 34, wherein the one or more variable output display elements varies by one or more of: utilizing different colors; displaying different colors; and presenting different colors.

Example 42. The obscured feature detector of example 35, wherein the one or more variable output display elements varies by changing in size.

Example 43. The obscured feature detector of example 35, wherein the one or more variable output display elements varies by changing in shape.

Example 44. The obscured feature detector of example 35, wherein the one or more variable output display elements varies in direct proportion to the strength of the sensor reading.

Example 45. The obscured feature detector of example 35, wherein each of the one or more variable output display elements varies in a manner non-linear to the strength of the sensor reading.

Example 46. The obscured feature detector of example 35, wherein each of the one or more variable output display elements may display in either a binary mode, or a variable mode.

Example 47. The obscured feature detector of example 35, wherein the variable output of each of the variable output display elements may be one or more of strength and intensity.

Example 48. The obscured feature detector of example 35, wherein two or more display elements can display in either in a binary mode, or in a variable mode.

Example 49. The obscured feature detector of example 32, wherein the obscured feature detector is configured such that the user can select between the binary mode and the variable mode.

Example 50. The obscured feature detector of example 35, wherein the controller determines whether to display in variable mode, or binary mode.

Example 51. The obscured feature detector of example 35, wherein the obscured feature detector is configured to display in both binary and variable mode simultaneously.

Example 52. The obscured feature detector of example 35, wherein the variable output display elements comprise an array of LEDs.

Example 53. The obscured feature detector of example 35, wherein the controller is configured to activate the display indication with more than one level of sensitivity.

Example 54. The obscured feature detector of example 35, configured such that the user can manually adjust the sensitivity of the display indication.

Example 55. The obscured feature detector of example 35, wherein the display, controller, and display are contained within the same housing.

Example 56. The obscured feature detector of example 35, wherein each capacitance reading corresponds to a corresponding display element.

Example 57. The obscured feature detector of example 35, wherein each capacitance reading doesn't directly correspond to a particular display element.

Example 58. A display for an obscured feature detector comprising: two or more variable output display elements each presenting a range of strength of indication levels; and a sensing element interface to couple to sensing elements to receive input for two or more sensor readings of the sensing elements; and one or more mapping functions to input the two or more sensor readings and to output the strength of indication levels for the two or more variable output display elements; and an auto-corrector that changes a given mapping function of the one or more mapping functions if the given mapping function would otherwise map a sensor reading to a value beyond the range of the strength of indication levels of a display element.

Example 59. The display of example 58, wherein the strength of indication level varies in response to a voltage level.

Example 60. The display of example 58, wherein the strength of indication level varies in response to a digital value.

Example 61. The display of example 58, wherein the auto-corrector operates each time a new sensor reading becomes available.

Example 62. The display of example 58, wherein a given mapping function for the two or more sensing elements are simultaneously adjusted if the given mapping function would otherwise map a sensor reading to a value beyond the range of the strength of indication levels of a display element.

Example 63. The display of example 58, wherein the one or more mapping functions for all of the two or more variable output display elements are simultaneously adjusted if the one or more mapping functions would otherwise map a sensor reading to a value beyond the range of the strength of indication levels of a display element.

It will be obvious to those having skill in the art that many changes may be made to the details of the above-described embodiments without departing from the underlying principles of the invention. The scope of the present invention should, therefore, be determined only by the following claims.

The invention claimed is:

1. A display for an obscured feature detector, comprising:

a first variable output display element to display a first visual non-binary indication of a strength of a capacitance sensor reading from one or more sensing elements of an obscured feature detector, based on one or more inputs from the one or more sensing elements;

a second variable output display element to display a second visual non-binary indication of a strength of a capacitance sensor reading from the one or more sensing elements, based on one or more inputs from the one or more sensing elements, wherein the first visual non-binary indication and the second non-binary visual indication are independent and are to display simultaneously; and a controller to activate the variable output display elements to drive display of the indication of the strength of the capacitance sensor reading from the one or more sensing elements, wherein the controller is coupled to the first and second variable output display elements and is to couple to the one or more sensing elements of the obscured feature detector.

2. The display of claim 1, wherein the controller determines calibration values for the one or more sensing elements.

3. The display of claim 2, wherein the controller determines the calibration values by:

performing a capacitance sensor reading on the one or more sensing elements of the obscured feature detector, determining the calibration values by subtracting each of the capacitance sensor readings from a common value, and storing a calibration value for each of the one or more sensing elements in memory.

4. The display of claim 1, wherein the first variable output display element and the second variable output display element vary by changing in brightness.

5. The display of claim 1, wherein the first variable output display element nd the second variable output display element vary by changing in color.

6. The display of claim 1, wherein the first variable output display element and the second variable output display element vary by changing in size.

7. The display of claim 1, wherein the first variable output display element and the second variable output display element vary by changing in shape.

8. The display of claim 1, wherein the first variable output display element and the second variable output display element vary in direct proportion to the strength of the sensor reading.

9. The display of claim 1, wherein each of the first variable output display element and the second variable output display element vary in a manner non-linear to the strength of the sensor reading.

10. The display of claim 1, wherein the variable output of each of the variable output display elements may be one or more of strength and intensity.

11. The display of claim 1, wherein the first variable output display element and the second variable output display element can display in one or more of a binary mode and a variable mode.

12. The display of claim 11, configured so that the user can select between the binary mode or the variable mode.

13. The display of claim 11, wherein the controller determines whether the first variable output display element and the second variable output display element display in variable mode or binary mode.

14. The display of claim 1, wherein the first variable output display element and the second variable output display element comprise an array of LEDs.

15. The display of claim 1, wherein the controller is configured to activate the display indication with more than one level of sensitivity.

16. The display of claim 1, configured such that the user can manually adjust the sensitivity of the display indication.

17. The display of claim 1, wherein the first variable output display element, the second variable output display element, and the controller are contained within the same housing.

18. An obscured feature detector, comprising:

one or more sensing elements to detect an obscured feature and provide a capacitance sensor reading that is based on one or more properties an obscured feature and that is configured to vary corresponding to a likelihood that an obscured feature is present;

a first variable output display element to display a first visual non-binary indication of one or more capacitance sensor readings from the one or more sensor elements a second variable output display element to display a second visual non-binary indication of a strength of a capacitance sensor reading from the one or more sensing elements, wherein the first visual non-binary indication and the second non-binary visual indication are independent and are to display simultaneously; and a controller to activate the one or more variable output display elements to drive a variable output display, wherein the controller is coupled to the one or more sensing elements and is coupled to the first and second variable output display elements.

19. The obscured feature detector of claim 18, wherein the controller determines calibration values for each of the one or more sensing elements.

20. The obscured feature detector of claim 18, wherein the controller determines the calibration values by:

placing the obscured feature detector on a surface, performing a respective capacitance sensor reading on the one or more sensing elements of the obscured feature detector on the surface, calculating each of the calibration values by subtracting the respective capacitance sensor reading from a common value, and storing the calibration value for each of the one or more sensing elements in memory.

21. The obscured feature detector of claim 18, wherein the first variable output display element and the second variable output display element vary by changing in brightness.

22. The obscured feature detector of claim 18, wherein the first variable output display element and the second variable output display element vary by changing in color.

23. A display for an obscured feature detector comprising:

a first variable output display element presenting a first visual non-binary value of strength of indication levels;

a second variable output display element presenting a second visual non-binary value of strength of indication levels; and a sensing element interface to couple to sensing elements to receive input for two or more sensor readings of the sensing elements; and one or more mapping functions to input the two or more sensor readings and to output the strength of indication levels for the first variable output display element and the second variable output display element; and an auto-corrector that changes a given mapping function of the one or more mapping functions if the given mapping function would otherwise map a sensor reading to a value beyond the range of the strength of indication levels of a display element.

24. The display of claim 23, wherein the strength of indication level varies in response to a voltage level.

25. The display of claim 23, wherein the strength of indication level varies in response to a digital value.

26. The display of claim 23, wherein the auto-corrector operates each time a new sensor reading becomes available.

27. The display of claim 23, wherein a given mapping function for the two or more sensing elements are simultaneously adjusted if the given mapping function would otherwise map a sensor reading to a value beyond the range of the strength of indication levels of a display element.

28. The display of claim 23 wherein the one or more mapping functions for all of the variable output display elements are simultaneously adjusted if the one or more mapping functions would otherwise map a sensor reading to a value beyond the range of the strength of indication levels of a display element.

* * * * *